United States Patent
Banerjee et al.

(10) Patent No.: US 9,425,630 B2
(45) Date of Patent: Aug. 23, 2016

(54) EXTENDING BATTERY LIFE FOR A RECHARGEABLE BATTERY

(75) Inventors: Neel Banerjee, Corvallis, OR (US); Anton Nicholas Clarkson, Corvallis, OR (US); Jeffrey Todd Mabeck, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 14/344,031

(22) PCT Filed: Sep. 8, 2011

(86) PCT No.: PCT/US2011/050881
§ 371 (c)(1),
(2), (4) Date: Mar. 10, 2014

(87) PCT Pub. No.: WO2013/036234
PCT Pub. Date: Mar. 14, 2013

(65) Prior Publication Data
US 2014/0217984 A1    Aug. 7, 2014

(51) Int. Cl.
*H02J 7/00* (2006.01)
*H01M 10/48* (2006.01)
*H01M 10/42* (2006.01)

(52) U.S. Cl.
CPC .............. *H02J 7/00* (2013.01); *H01M 10/42* (2013.01); *H01M 10/48* (2013.01); *H02J 7/0057* (2013.01)

(58) Field of Classification Search
CPC ........................................................ H02J 7/00
USPC ........................................................ 320/128
See application file for complete search history.

(56) References Cited

U.S. PATENT DOCUMENTS

| | | | |
|---|---|---|---|
| 4,876,513 A | 10/1989 | Brilmyer | |
| 5,596,260 A | 1/1997 | Moravec et al. | |
| 5,994,878 A | 11/1999 | Ostergaard et al. | |
| 6,366,051 B1 | 4/2002 | Nantz et al. | |
| 6,456,042 B1 * | 9/2002 | Kwok | H02J 7/0029 320/128 |
| 6,771,047 B1 | 8/2004 | Ogonowsky | |
| 6,836,095 B2 | 12/2004 | Fogg | |
| 7,706,772 B2 * | 4/2010 | Malcolm | H04W 52/0241 455/343.4 |
| 2004/0222768 A1 * | 11/2004 | Moore | H02J 7/0075 320/128 |
| 2006/0108984 A1 * | 5/2006 | Johnson | B25F 5/02 320/128 |
| 2007/0024246 A1 | 2/2007 | Flaugher | |

(Continued)

FOREIGN PATENT DOCUMENTS

JP      2001056362      2/2001

OTHER PUBLICATIONS

International Search Report and Written Opinion received in PCT Application No. PCT/US2011/050881, mailed on Apr. 25, 2012, 12 pgs.

*Primary Examiner* — Edward Tso
*Assistant Examiner* — Dung V Bui
(74) *Attorney, Agent, or Firm* — HP Inc Patent Department (57) ABSTRACT

Technology is described for extending battery life for a rechargeable battery. The method can include estimating a desired energy storage for the rechargeable battery in an electronic device during an operating time period. Expected active periods for the rechargeable battery can be determined. A defined charge voltage can be computed based on the desired energy storage and expected active periods of the rechargeable battery in the electronic device. In addition, the rechargeable battery can be charged to the defined charge voltage.

20 Claims, 5 Drawing Sheets

(56) References Cited

U.S. PATENT DOCUMENTS

| | | | |
|---|---|---|---|
| 2008/0231284 A1* | 9/2008 | Birke | B60L 3/12 324/426 |
| 2008/0290833 A1 | 11/2008 | Hayashi | |
| 2008/0315836 A1 | 12/2008 | Matsumura et al. | |
| 2009/0058361 A1* | 3/2009 | John | A61N 1/3785 320/128 |
| 2009/0108810 A1* | 4/2009 | Sawyers | H01M 10/441 320/137 |
| 2010/0007310 A1* | 1/2010 | Kawamoto | H01M 10/425 320/134 |
| 2010/0212338 A1* | 8/2010 | Hermann | B60H 1/00278 62/118 |
| 2010/0283427 A1 | 11/2010 | Sugiyama et al. | |
| 2014/0217984 A1* | 8/2014 | Banerjee | H01M 10/48 320/128 |

\* cited by examiner

EXTENDING BATTERY LIFE FOR A RECHARGEABLE BATTERY

BACKGROUND

When using rechargeable batteries in electrical or electronic systems, the ability to extend the period of a rechargeable battery's charge and overall battery life is valuable. Existing charging systems typically charge a battery to the same fixed charge voltage each time that the battery is recharged. The manufacturer's recommended charge voltage is typically selected to maximize initial battery run time. In contrast, reducing the charge voltage of a rechargeable battery cell (e.g., lithium ion) can provide a longer life, especially when the rechargeable battery is exposed to higher environmental temperatures. However, a system designed with a battery charger that charges to a fixed lower initial voltage to provide a longer life cannot utilize the full capacity of the battery when the use case and environmental conditions may change, thus cutting the discharge time shorter than is desirable for many use cases.

DETAILED DESCRIPTION

Reference will now be made to the examples illustrated in the drawings and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

An example of an electronic device where rechargeable batteries can be used and rechargeable battery life is desired to be lengthened is a land based sensor node system. In one example, batteries used in such sensor node systems are a component of land based seismic surveys. It is likely that under harsh environmental conditions, rechargeable batteries can reach an end of life earlier than other components of the sensor nodes and related systems. The cost and time to replace the batteries in a high channel count survey system can be substantial. Extending the battery life of rechargeable batteries in other example systems such as electronic music players, tablets, laptops, portable DVD players, and other such devices is also valuable.

Existing battery charging and re-charging systems do not allow for dynamic adjustment of the cell or rechargeable battery charge voltage based on use case and environmental conditions. A technology is described that can help extend the battery life for a rechargeable battery. This technology can provide an increased deployment time for a rechargeable battery while extending the lifetime of the rechargeable battery.

Figure 1:
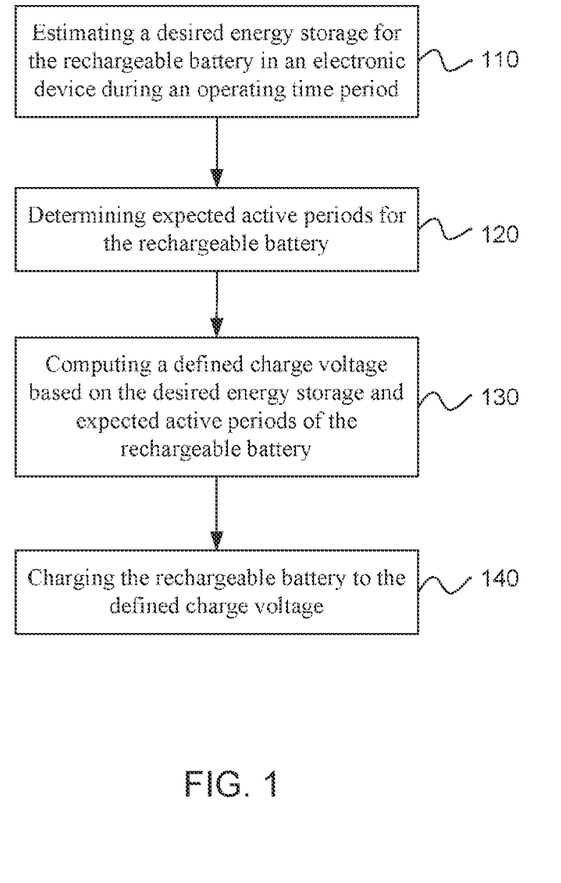
FIG. 1 is a flow chart illustrating an example of a method for extending the battery life for a rechargeable battery.

FIG. 1 illustrates an example method for extending the battery life for a rechargeable battery. A rechargeable battery can be defined as one or more electrochemical cells that are packaged individually or packaged with multiple cells in a battery pack. A rechargeable battery can be made from materials that allow the battery charge to be discharged and then recharged. Battery types that may be recharged can include lithium ion batteries, nickel cadmium batteries, nickel metal hydride batteries, or any other type of rechargeable battery.

One operation in the method can be estimating desired energy storage for the rechargeable battery in an electronic device during an operating time period, as in block 110. The defined energy storage can be based on the energy desired to power sensors and other power uses in the electronic device. The expected active periods for the rechargeable battery can then be determined, as in block 120. The expected active periods may be defined based on known periods of time where electrical circuits, sensors and other electronic components are consuming power in the electronic device. For example, it may be known that certain sensors, input circuits, or electronic circuits are powered for 50% of every hour or the expected active periods can be determined from previous usage information that the device tracks. Determining the expected active periods for the battery can also include determining the combination of the temperature exposure and total active time expected over the operation time period.

A defined charge voltage can be computed based on the desired energy storage and expected active periods of the rechargeable battery in the electronic device, as in block 130. The defined charge voltage may be a reduced voltage that will provide the desired energy storage and lengthen the battery life. The rechargeable battery can then be charged to the defined charge voltage, as in block 140.

The technology can enable dynamic adjustment of the charge voltage or state of charge (SOC) and target end-of-discharge voltage based on input factors. Examples of factors that may be used can include: estimated energy use for the battery, estimated temperature exposure of the battery, active and dormant battery time, and previous battery pack history. Such input factors can then be used to determine the state of charge (SOC) that can meet the desired energy capacity for the next battery discharge cycle while extending battery life.

A database can also be used to store information about the last capacity of the battery or the average battery temperature over time. The database allows the expected energy available from the rechargeable battery to be calculated based on the average expected environmental temperature (e.g., air temperature) over the duration of the rechargeable battery usage. The database may be local to the electronic device or the database may be located at a remote location that can be accessed via a wireless network, wired network, or another communication process.

Figure 2:
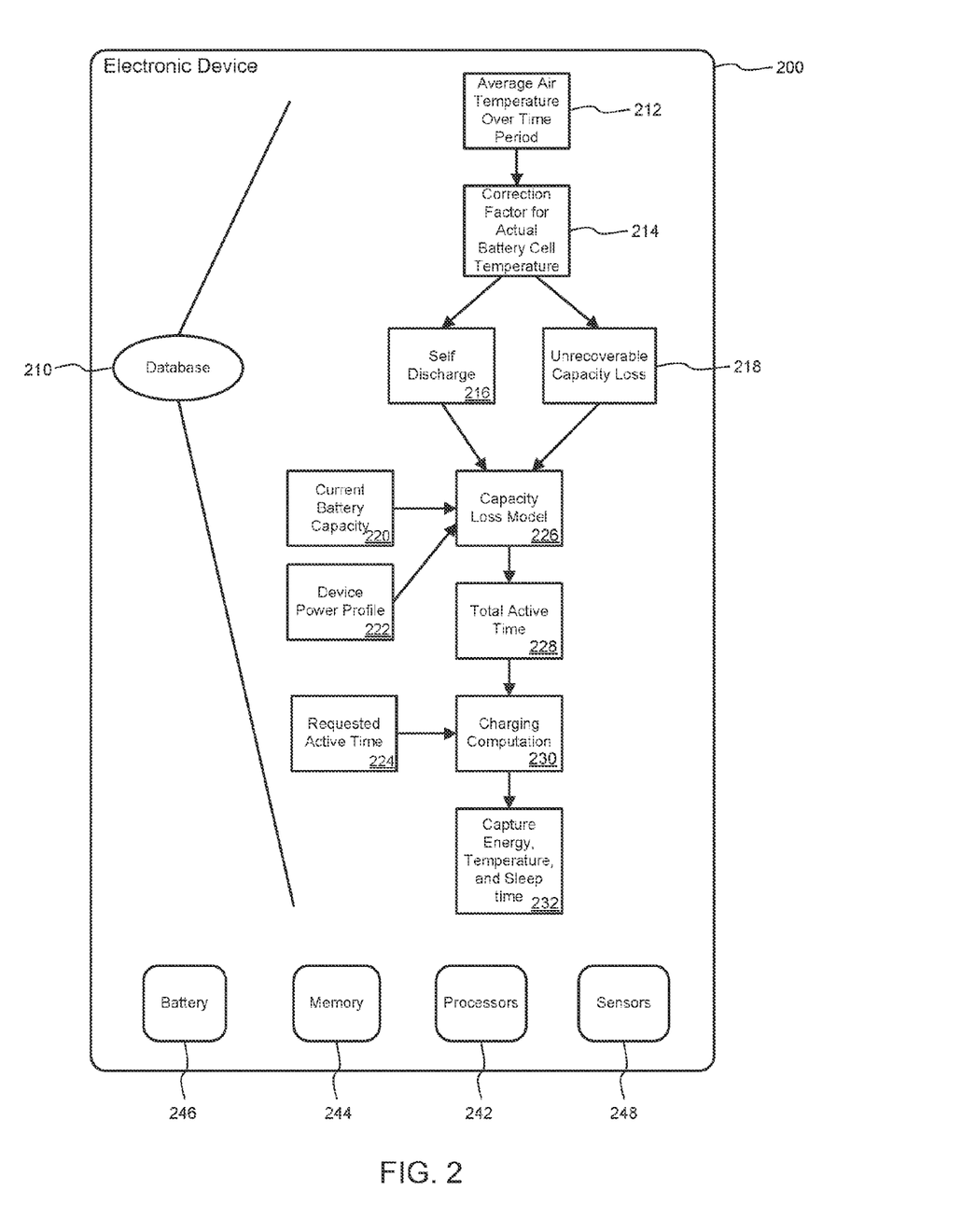
FIG. 2 a block diagram illustrating an example of a system to extend the life of the rechargeable battery.

FIG. 2 illustrates a system using environment information, battery data, and other factors that can be incorporated into charging computations to extend the life of a rechargeable battery 246. Data can be retrieved from a database 210. The data in the database may be data that is generated by the electronic device 200 using the rechargeable battery or the data may have been loaded into the database before the electronic device begins to operate. An example of preloaded battery information can be aggregate historical battery data from a manufacturer's battery cells used in other identical systems or similar systems.

The average air temperature over a time period 212 can be retrieved from the database. This average air temperature can reflect the average air temperature as historically estimated for the calendar dates, times of day, and location of the electronic device. Historical measurements may also apply equally to water or another environment within which the electronic device is operating (e.g., a natural gas well). Knowing the historical air temperature measurements can allow the system to estimate the expected air temperature or environmental temperature when the battery is expected to be operating. As a result, the charge voltage can be adjusted based on an estimated future average air temperature over the operating time period. For example, the self discharge and unrecoverable capacity loss are a function of environmental temperature. A correction factor can also be applied for the actual battery cell temperature 214 or current rechargeable battery temperature when computing the defined charge voltage. To reiterate, an estimated temperature exposure over the operating time period of the rechargeable battery can used in calculating the defined charge voltage for the rechargeable battery.

Historical attributes for the rechargeable battery can be used to compute the defined charge voltage. One aspect of a battery's history can be taking into account the historical self-discharge 216 of the rechargeable battery to determine the defined charge voltage. Battery self-discharge may occur due to internal chemical reactions or battery leakage currents. Unrecoverable capacity loss 218 can also be taken into account. Rechargeable batteries may degrade over time and the recharging system can test to determine what capacity is lost by the rechargeable battery over time. The battery self-discharge and the unrecoverable capacity loss can be used by the capacity loss model 226.

A device power profile 222 can be taken into account to determine the defined charge voltage. The device power profile can define the amount of power consumed by the electronic device based on the functions the electronic device is expected to perform. In addition, the current battery capacity 220 can be measured. The device power profile and the current battery capacity or most recent capacity can also be included in the capacity loss model.

A total active time and/or dormant time 228 can be defined for the rechargeable battery to aid in determining the defined charge voltage desired for the battery's period of use. The total active time and dormant time can be determined based on actual historical usage or estimated historical usage. The requested active time 224 can also be taken into account and used in a charging computation module 230. The requested active time can be the estimated time that the electronic device has been requested or programmed to be active by an end user.

The database can store historical battery attributes that have been defined and/or collected, and this rechargeable battery information can be used for finding the defined charge voltage. More specifically, the electronic device can capture energy usage, environmental temperature, battery temperature, and device sleep time in a module 232 designed to capture and record this information. For example, the database can record an average rechargeable battery temperature during the previous use of the rechargeable battery in order to update the temperature and capacity loss models. In addition, the target end-of-discharge voltage can be tuned to increase battery lifetime.

The electronic device in FIG. 2 can also include other computer hardware components in order to allow the electronic device to operate. A hardware processor 242 and hardware memory device 244 can be used for the charging computation and computing the capacity loss model. In addition, the processor can be in communication with the device sensors 248 to transport collected data for storage in the database 210.

Being able to increase the overall battery life can reduce the number of battery replacements in an electronic device. For example, extending battery life can increase the number of times the battery can be recharged before the battery becomes ineffective. Battery replacement may even be eliminated in some electronic devices depending on the device's use patterns. Being able to reduce the charge voltage can also increase the safety of the battery because the battery is not always charged to the maximum charge voltage and energy capacity. This may avoid battery rupturing, battery overheating, or other battery failures. In the case of sensor devices that are placed for relatively long periods of time, increased battery life can increase the reliability of the sensor survey by decreasing early failures in node batteries.

As an example, assume that the average power consumption for an electronic device is 80 mW and the duration of usage is 20 days (i.e., 480 hours). The average temperature of the environment can retrieved from a database that contains historical information about the temperature (e.g., 45 degrees Celsius). A correction factor can be used to estimate what the air temperature versus battery pack temperature will be (e.g., 50 degrees Celsius). This corrected factor can be used to estimate the self-discharge and unrecoverable capacity loss of the battery as a percentage of the battery capacity over the given time period (e.g., 95%, 99%). A model that combines these inputs can be programmable via a database, but a simple model can be one in which the effects of self-discharge and capacity loss are independently correlated and therefore a multiplication of the effects is used (94.05%). Cycle-to-cycle battery capacity can be stored in the database by subtracting the self-discharge and capacity loss effects from the battery capacity. Therefore, given a battery pack with six lithium ion battery cells that has a capacity of 58.32 Wh de-rated by the self-discharge and unrecoverable capacity loss effects can have an effective capacity of 54.85 Wh. This would allow an 80 mW system to operate for 685.6 hours. This is well over the 480 hours used by the desired use case for the battery charge. Therefore, 480/685.6≈70% of the actual battery capacity may be supplied in this use case.

The charging system can then determine a desired method to charge the battery. Specifically, reducing the charge voltage can increase the battery lifetime. Additionally, the target end-of-discharge voltage can also be raised to increase battery lifetime. A method to achieve an optimized charge voltage is to estimate the total energy desired to meet the duration of usage requested. If the total requested energy is less than the available energy in the battery, the system chooses either using the full capacity or the method described to extend battery life. The database may contain the information to make capacity decisions, which can be pre-selected by the user, learned from user patterns, or set to default values.

The energy capacity that is desired can be delivered by the charging method, in addition to setting the charge voltage and target end-of-discharge voltage to increase battery life. Any charge method can be used (constant current/constant voltage, stepped, pulse, etc.). The charging system can sum the total energy delivered to the battery de-rated by the expected charging efficiency of the cell chemistry to the actual capacity. The charge voltage and end-of-discharge voltage can also be set based on the rechargeable battery information stored in the database.

Figure 3:
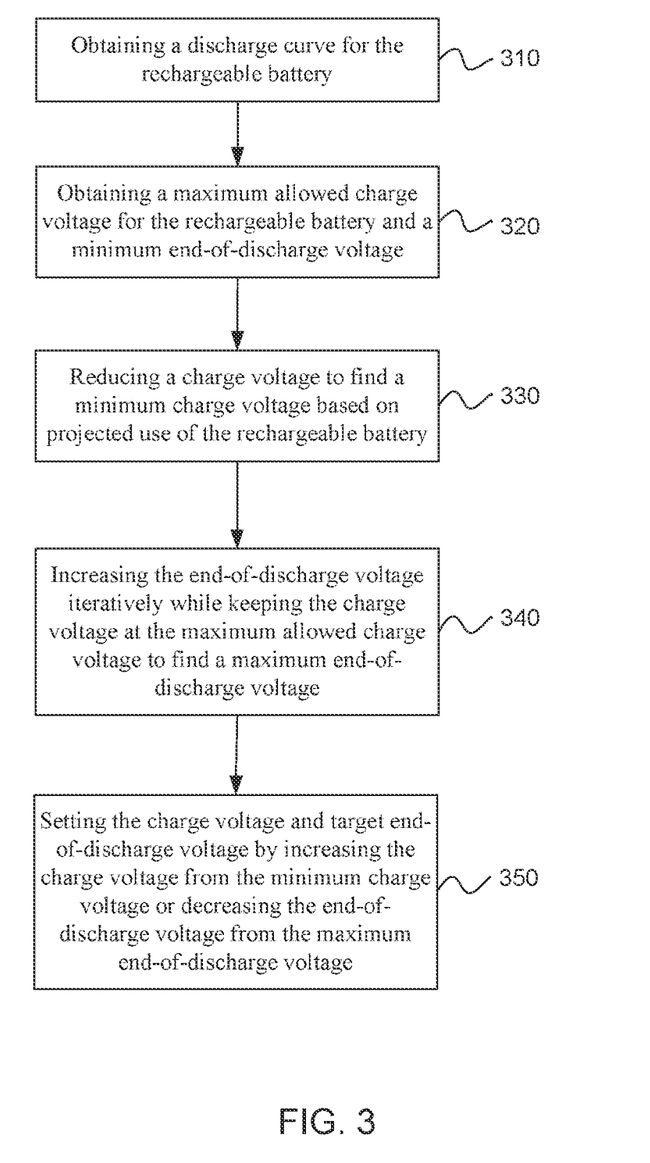
FIG. 3 is a flowchart illustrating an example of a high level method for extending the battery life for a rechargeable battery by decreasing the charge voltage and/or increasing the end-of-charge voltage.

FIG. 3 illustrates a high level example method for extending battery life of a rechargeable battery. This high level example will be followed by a more detailed example of a similar method. The method can include the operation of obtaining a discharge curve for the rechargeable battery, as in block 310. A maximum allowed charge voltage for the rechargeable battery and a minimum end-of-discharge voltage can also be obtained, as in block 320.

A charge voltage can be reduced iteratively to find a minimum charge voltage based on projected use of the rechargeable battery in an electronic device, as in block 330. The projected use can define a charge amount desired for the battery. The end-of-discharge voltage can then be increased iteratively while keeping the charge voltage at the maximum allowed charge voltage to find a maximum end-of-discharge voltage for the capacity for the projected use, as in block 340. The charge voltage and target end-of-discharge voltage can be set by increasing the charge voltage from the minimum charge voltage and/or decreasing the end-of-discharge voltage from the maximum end-of-discharge voltage until the capacity for the projected use is reached for the rechargeable battery, as in block 350.

Figure 4:
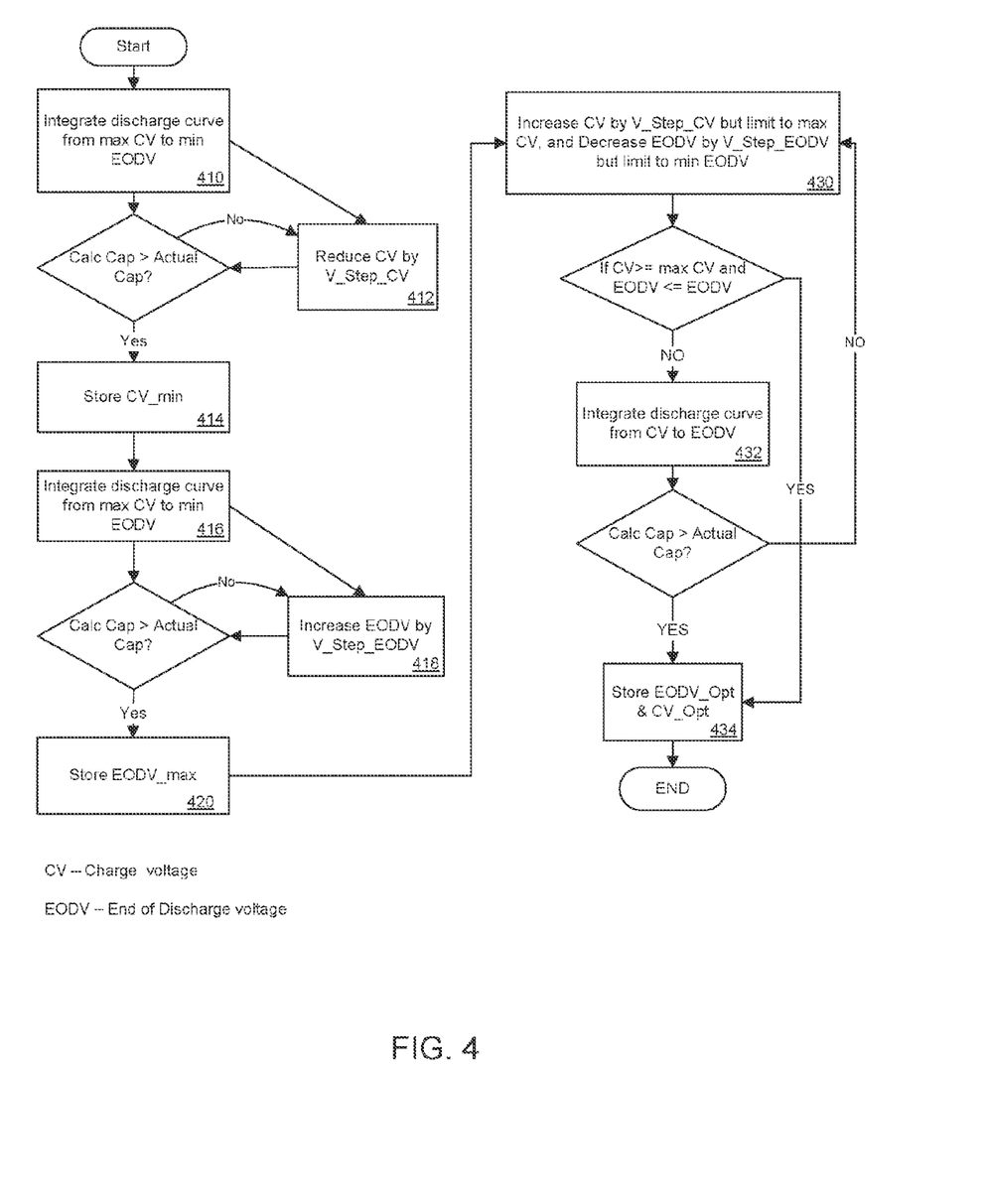
FIG. 4 is a flowchart illustrating an example of a more detailed description for a method for extending the battery life for a rechargeable battery by decreasing the charge voltage and/or increasing the end-of-charge voltage.

FIG. 4 illustrates a more detailed method for extending rechargeable battery life that is similar to the method described at a higher level in FIG. 3. As an example, the charging method can determine the charge voltage and target end-of-discharge voltage by looking up a discharge curve that describes the rechargeable battery's output voltage vs. time with constant current draw. Each rechargeable battery has a specified maximum charge voltage (CV) and minimum end of discharge voltage (EODV) when using a maximum battery charge. The total charge can be found by integrating the discharge from the maximum charge voltage (CV) to the minimum end-of-discharge voltage (EODV), as in block 410. The method seeks to find the area of least voltage change.

The method can use the maximum charge voltage CV (CV_max) allowed and minimum end-of-discharge voltage EODV (EODV_min) and iteratively reduce the charge voltage to seek the minimum charge voltage CV (CV_min) until the actual capacity desired by the use case is reached, as in block 412. The minimum charge voltage (CV) can then be stored, as in block 414.

The method then searches iteratively for the highest end of discharge (EODV_max) voltage while keeping the charge voltage at CV_max. The discharge curve can be integrated from the maximum charge voltage (CV) to the minimum end-of-discharge voltage (EODV) 416. The end-of-discharge voltage (EODV) can be increased by a step-wise amount to reach a maximum end-of-discharge voltage (EODV) 418 for the actual capacity desired by the use case while the charge voltage (CV) is at a maximum amount. The maximum end-of-discharge voltage (EODV) can then be stored 420.

The EODV and CV are then decreased and increased 430, respectively. These two values CV_min and EODV_max are used again to calculate the charge energy 432. The EODV and CV are then decreased and increased respectively until the actual capacity desired is reached or the limits CV_max or EODV_min are reached 430. This allows for an efficient method that finds the desired operating conditions for the battery. The EODV_min value does not need to be at the manufacturer's specification but could be higher to allow for added margin during deployment. The optimized charge voltage values CV_opt and EODV_opt can be stored in memory 434.

The voltage steps used for decreasing EODV and increasing CV can be un-equal step sizes and may focus on minimizing CV more than extending the target EODV, or vice versa. Alternatively, the steps may increase or decrease in size as the expected thresholds are approached or vice versa.

A further step is to capture the total electrical energy that was discharged during the use of the battery, the temperature conditions of the battery, and the time that the battery was operating significantly below the average discharge rate. This information can be saved to the database to calculate the next current battery capacity and update the temperature and capacity loss models.

Figure 5:
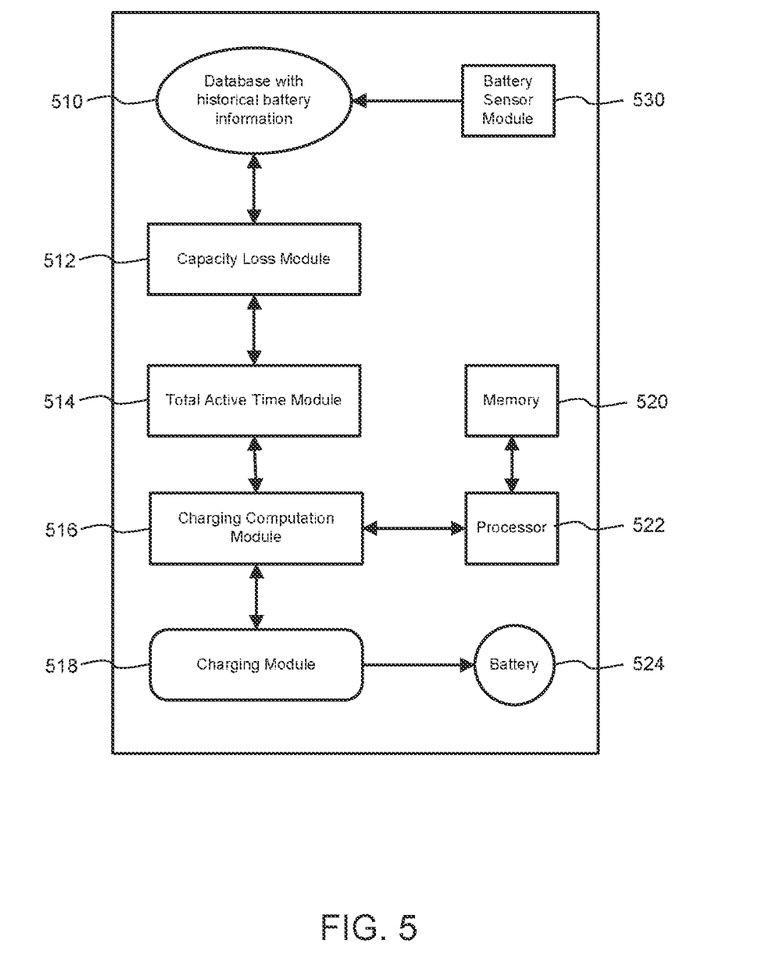
FIG. 5 is a block diagram illustrating an example of a system to extend the life of the rechargeable battery and to use a database for storing rechargeable battery attributes, history, and related information.

FIG. 5 illustrates a system for extending battery life for a rechargeable battery. The system can include a database 510 to store historical battery attribute data and projected battery use. A capacity loss module can receive information from the database to determine capacity loss of the rechargeable battery over time.

A total active time module 514 can estimate and/or record active use time for the rechargeable battery. The active use time aids in projecting how long a battery may be used with a given energy storage amount. In addition, the dormant times can be inferred from the active time history. A charging computation module can be used to compute a charging voltage based on the historical battery attribute data, the capacity loss and/or the active use time. A charging module 518 can recharge the battery 524 at the computed charging voltage.

Electronic device sensors 530 and electronic circuits can detect and/or determine the battery energy used, battery temperature, and battery sleep time. Once this historical information has been measured, then the data can be recorded in the database 510. The database may be initially populated with estimated battery attribute information and historical temperature or weather information.

This technology can provide increased battery life for rechargeable batteries. The extended battery life can also decrease the total cost of ownership of the batteries and the electronic devices that are powered by the rechargeable batteries. Longer battery life can also result in decreased labor for fleet battery management.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for extending battery life for a rechargeable battery, comprising:
   determining, using a processor, an amount of energy expected to be used during an operating time period based on expected active periods for the rechargeable battery during the operating time period;
   estimating, using the processor, a desired energy storage for the rechargeable battery based on the amount of energy expected to be used;
   computing, using the processor, a defined charge voltage based on the desired energy storage; and
   charging the rechargeable battery to the defined charge voltage.

2. The method as in claim 1, further comprising computing an estimated temperature exposure over the operating time period of the rechargeable battery to use in calculating the defined charge voltage for the rechargeable battery.

3. The method as in claim 2, further comprising applying a correction factor for an actual battery cell temperature when computing the defined charge voltage.

4. The method as in claim 1, further comprising determining the expected active periods based on a history of the rechargeable battery.

5. The method as in claim 1, further comprising taking into account the historical self-discharge of the rechargeable battery to determine the defined charge voltage.

6. The method as in claim 1, further comprising using a power profile for the electronic device to determine the defined charge voltage.

7. The method as in claim 1, further comprising defining a dormant time for the rechargeable battery to determine the defined charge voltage.

8. The method as in claim 1, further comprising using a database to store historical battery attributes used for finding the defined charge voltage.

9. The method as in claim 8, further comprising using the database to store a last capacity of the rechargeable battery.

10. The method as in claim 8, further comprising using the database to record an average rechargeable battery temperature during use of the rechargeable battery in order to update temperature and capacity loss models.

11. The method as in claim 1, further comprising tuning a target end-of-discharge voltage to increase battery lifetime.

12. A method for extending battery life of a rechargeable battery, comprising:
   obtaining, using a processor, a discharge curve for the rechargeable battery;
   obtaining, using the processor, a maximum allowed charge voltage for the rechargeable battery and a minimum end-of-discharge voltage using the discharge curve;
   computationally reducing, using the processor, a charge voltage iteratively to find a minimum charge voltage that would provide sufficient energy for a projected use of the rechargeable battery in an electronic device;
   computationally increasing, using the processor, the end-of-discharge voltage iteratively while keeping the charge voltage at a maximum allowed charge voltage to find a maximum end-of-discharge voltage that would provide sufficient energy for the projected use;
   setting, using the processor, the charge voltage and target end-of-discharge voltage by computationally increasing the charge voltage from the minimum charge voltage or decreasing the end-of-discharge voltage from the maximum end-of-discharge voltage until the charge voltage and the end-of-discharge voltage would provide sufficient energy for the projected use; and
   charging the rechargeable battery to the charge voltage.

13. The method as in claim 12, further comprising defining the charge voltage based on a history of the rechargeable battery.

14. The method as in claim 12, further comprising defining the charge voltage based on computing a temperature exposure of the rechargeable battery during an operating time period.

15. The method as in claim 12, further comprising defining the charge voltage based on determining expected active and dormant periods for the rechargeable battery.

16. The method as in claim 12, further comprising defining the charge voltage based on an estimated future average air temperature over an operating time period.

17. The method as in claim 12, further comprising applying a correction factor for an actual battery cell temperature.

18. The method as in claim 12, further comprising taking into account a historical self discharge of the rechargeable battery, a power profile for the electronic device, a last capacity of the rechargeable battery, or an average rechargeable battery temperature expected during use of the rechargeable battery.

19. A system for extending battery life for a rechargeable battery, comprising:
- a database to store historical battery attribute data;
- a capacity loss module to determine capacity loss of the rechargeable battery over time;
- a total active time module to record active use time for the rechargeable battery;
- a charging computation module to:
  - determine an anticipated future energy usage based on the active use time;
  - compute a charging voltage based on the historical battery attribute data, the capacity loss, and the anticipated future energy usage; and
- a charging module to re-charge the rechargeable battery at the computed charging voltage.

20. The system as in claim 19, further comprising electronic device sensors to record battery energy used, battery temperature, and battery sleep time for recording in the database.

* * * * *